United States Patent
Sarafijanovic et al.

(10) Patent No.: US 11,061,579 B2
(45) Date of Patent: Jul. 13, 2021

(54) ACCESS ORDERING FOR TAPE CYCLE OPTIMIZATION

(71) Applicant: International Business Machines Corporation, Armonk, NY (US)

(72) Inventors: Slavisa Sarafijanovic, Adliswil (CH); Mark Alfred Lantz, Adliswil (CH); Vinodh Venkatesan, Waedenswil (CH); Paul Merrill Greco, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/566,964

(22) Filed: Sep. 11, 2019

(65) Prior Publication Data
US 2021/0072900 A1 Mar. 11, 2021

(51) Int. Cl.
*G06F 3/06* (2006.01)

(52) U.S. Cl.
CPC .......... *G06F 3/0611* (2013.01); *G06F 3/0643* (2013.01); *G06F 3/0659* (2013.01); *G06F 3/0682* (2013.01)

(58) Field of Classification Search
CPC .... G06F 3/0611; G06F 3/0659; G06F 3/0682; G06F 3/0643
See application file for complete search history.

(56) References Cited

U.S. PATENT DOCUMENTS

| | | | |
|---|---|---|---|
| 5,845,316 A | 12/1998 | Hillyer et al. | |
| 6,349,356 B2 | 2/2002 | Basham et al. | |
| 6,763,427 B1 | 7/2004 | Doi et al. | |
| 8,082,388 B2 | 12/2011 | Bello et al. | |
| 8,812,800 B2 | 8/2014 | Usami | |
| 9,021,175 B2 | 4/2015 | Butt et al. | |
| 9,244,628 B2 | 1/2016 | Butt et al. | |
| 9,513,818 B2 | 12/2016 | Whitney | |
| 2001/0034811 A1 | 10/2001 | Basham et al. | |
| 2012/0154946 A1 | 6/2012 | Katagiri et al. | |

(Continued)

FOREIGN PATENT DOCUMENTS

WO 2010073776 A1 7/2010

OTHER PUBLICATIONS

Ruse et al., "Enhancing the low-level tape layer of CERN Tape Archive software", University Politehnica of Bucharest Faculty of Automatic Control and Computers Computer Science and Engineering Department, Master Thesis, Sep. 2017, 32 pages. https://cds.cern.ch/record/2282014/files/CERN-THESIS-2017-131.pdf.

(Continued)

*Primary Examiner* — Eric Cardwell
(74) *Attorney, Agent, or Firm* — Timothy J. Singleton (57) ABSTRACT

A method for data storage tape access optimization is provided. The method identifies a plurality of data segments stored on a data storage tape. Each segment having a location and a size on the data storage tape. The method determines a subset of data segments stored on the data storage tape selected for retrieval. The method determines an access order for the subset of data segments. The access order represents a minimized tape cycle time for retrieving the subset of data segments. The method retrieves the subset of data segments from the data storage tape based on the access order.

13 Claims, 7 Drawing Sheets

(56) References Cited

U.S. PATENT DOCUMENTS

2014/0043710 A1* 2/2014 Katagiri ................ G11B 20/10
360/48

OTHER PUBLICATIONS

"Time-Based Access Order System for Increasing File Read Throughput on Tape", Spectra, Jul. 2018, Copyright © 2018 Spectra Logic Corporation, 13 page. https://edge.spectralogic.com/index.cfm?fuseaction=home.displayFile&DocID=5035.
"What is LTO Technology'?", Ultrium LTO, printed Jun. 7, 2019, 4 pages. https://www.ito.org/technology/what-is-ito-technology/.
"Programming Reference", IBM Tape Device Drivers, IBM, Eighth Edition (Dec. 2013), pp. 207-210.
Sarafijanovic et al., "Group-Based Tape Storage Access Ordering", U.S. Appl. No. 16/566,976, filed Sep. 11, 2019.
List of IBM Patents or Patent Applications Treated As Related, dated Sep. 10, 2019, 2 pages.

* cited by examiner

ACCESS ORDERING FOR TAPE CYCLE OPTIMIZATION

BACKGROUND

Data storage tape is commonly used due to cost advantages over other storage technologies. Data storage tape is often used for storing large amounts of data, where that data is infrequently accessed, and for which increased access time is acceptable. Data storage tape is often used for data backup and archiving, regulatory compliance, and data protection purposes. As users and companies produce more data, increased amounts of infrequently accessed data are generated every year. Such infrequently accessed data presents issues for tape storage users, tape hardware providers, and software providers due to increasing storage costs, access requests, and efficiency concerns.

SUMMARY

According to an embodiment described herein, a computer-implemented method for data storage tape access optimization is provided. The method identifies a plurality of data segments stored on a data storage tape. Each data segment has a location and a size on the data storage tape. The method determines a subset of data segments stored on the data storage tape. The subset of data segments are data segments selected for retrieval from the data storage tape. The method determines an access order for the subset of data segments. The access order represents a minimized tape cycle time for retrieving the subset of data segments. The method then retrieves the subset of data segments from the data storage tape based on the access order.

DETAILED DESCRIPTION

The present disclosure relates generally to methods for data access and retrieval. In particular, but not exclusively, the present disclosure relates to a computer-implemented method for data storage tape access optimization. The present disclosure relates further to a related system for data access and retrieval, and a computer program product for operating such a system.

Data storage tapes are often used for storing large amounts of infrequently accessed data. Data stored on these data storage tapes may be long lasting and cost effective. However, accessing specific records, files, or data stored on these data storage tapes often includes inefficiencies relating to access, processing, and retrieval times. While data storage tapes are often inexpensive, relative to their storage capacity, efficient usage of tape drives for reading data storage tapes is important due to expense and availability of tape drives used to service a tape storage system or repository workload. Purchase, servicing, and availability of tape drives may introduce additional costs to tape storage systems. When tape drives are used, data storage tapes are located and mounted or coupled to the tape drive. The tape drive is directed to access various portions of the tape by physically manipulating portions of the data storage tape in contact with a reader component. Once the selected data is read, the tape drive rewinds the data storage tape to a starting position. The data storage tape may then be removed or unmounted from the tape drive.

While tape storage systems are often used to maintain infrequently accessed data, when that data is called upon for access, some access systems and methodologies may include inefficiencies related to data retrieval of specified data. Data segments designated for retrieval may be files, portions of files, records, or any other data object which may be stored on a data storage tape. Since data storage tapes may include large numbers of data segments, managing and retrieving individual data segments or groups of data segments takes time.

Some tape storage systems identify or provide recommended access orders when groups of data segments are selected for retrieval from one or more data storage tapes. These recommended access orders attempt to efficiency read multiple files or data segments from a given data storage tape. Some tape storage systems provide recommended access orders based on reducing tape seek times for reading multiple data segments from a given data storage tape. Such tape storage systems may omit consideration of a last data segment's ending position, rewind time, and unmounting time from the recommended access order. Further such tape storage systems may focus on access of a single data storage tape when providing the recommended access order, omitting consideration of reading or accessing data from multiple data storage tapes. In such instances, where a tape drive is used to access a series of data storage tapes consecutively, a total tape cycle time (e.g., tape cycle time across multiple data storage tapes) may not be considered by present recommended access orders.

Some tape storage systems use active tape archive reads or partial backup restore, where consecutive reads of data from multiple data storage tapes. Such workloads often employ restricted or relatively smaller numbers of data segments per tape mount. Total tape cycle times for these tape storage systems, when employing recommended access orders, may be manipulated by increasing a number of tape drives used or increasing times for servicing certain workload requests. Active tape archives may be used in environments with large amounts of data and data sets, where an active storage capacity is limited. In such instances, at any given time, a limited portion of the data or data sets may be loaded to active storage for access or processing. Partial backup restore systems may be employed for data protection, such as in distributed storage systems used for handling failure of active storage components. Using recommended access orders in such systems may manipulate read times, without addressing total cycle times or workloads being processed.

Embodiments of the present disclosure provide methods, systems, and computer program products for generating optimized access orders (e.g., tape cycle orders) for data storage tapes by tape drives. Optimized access orders or tape cycle orders may be understood as a list of a recommended access order of data segments when reading multiple data segments so that the overall cycle time for reading those data segments is minimized. Such optimized access orders may take into account reading data segments from a single data storage tape or multiple data storage tapes. The optimized access orders may account for use of a single tape drive or multiple tape drives. The optimized access orders may account for a total tape cycle time including mounting a data storage tape, seek and read times, rewind times, and unmounting times for data segments on a single data storage tape or across multiple data storage tapes, whether using a single tape drive or multiple tape drives. If the tape drive implements a tape re-tensioning step prior to unloading the cartridge, then the total cycle time may also include the time to seek from the end of the last segment read to the furthest location along the length tape accessed during that mount cycle.

Some embodiments of the present disclosure provide methods, systems, and computer program products with an additional mode of tape drive operation. This mode of tape drive operation generates tape cycle orders which minimize (e.g., theoretically minimize) total tape cycle time. Such tape cycle orders enable reading data segments from data storage tapes based, at least in part, on optimizing or otherwise reducing total cycle time for a data storage tape or a cycle time across multiple data storage tapes. The tape cycle time may be understood as a total time taken by a tape drive to mount a tape, seek to and read data segments, rewind the tape to the beginning of tape, and unmount the tape. To support this mode of operation for reading tapes, the tape drive may employ one or more algorithms or set of operations that computes recommended access orders for reading the requested data segments that minimizes the tape cycle time.

In some embodiments, the drive mode and tape cycle order minimize a sum of the tape seeks and the tape rewind time, thus minimizing the overall tape cycle time. Thus, the drive mode and tape cycle order may reduce tape cycle times for data access operations for data storage tapes and increase workloads capable of being performed by one or more tape drives.

Some embodiments of the concepts described herein may take the form of a system or a computer program product. For example, a computer program product may store program instructions that, when executed by one or more processors of a computing system, cause the computing system to perform operations described above with respect to the computer implemented method. By way of further example, the system may comprise components, such as processors and computer readable storage media. The computer readable storage media may interact with other components of the system to cause the system to execute program instructions comprising operations of the computer implemented method, described herein. For the purpose of this description, a computer-usable or computer-readable medium may be any apparatus that may contain means for storing, communicating, propagating, or transporting the program for use, by, or in connection with, the instruction execution system, apparatus, or device.

Figure 1:
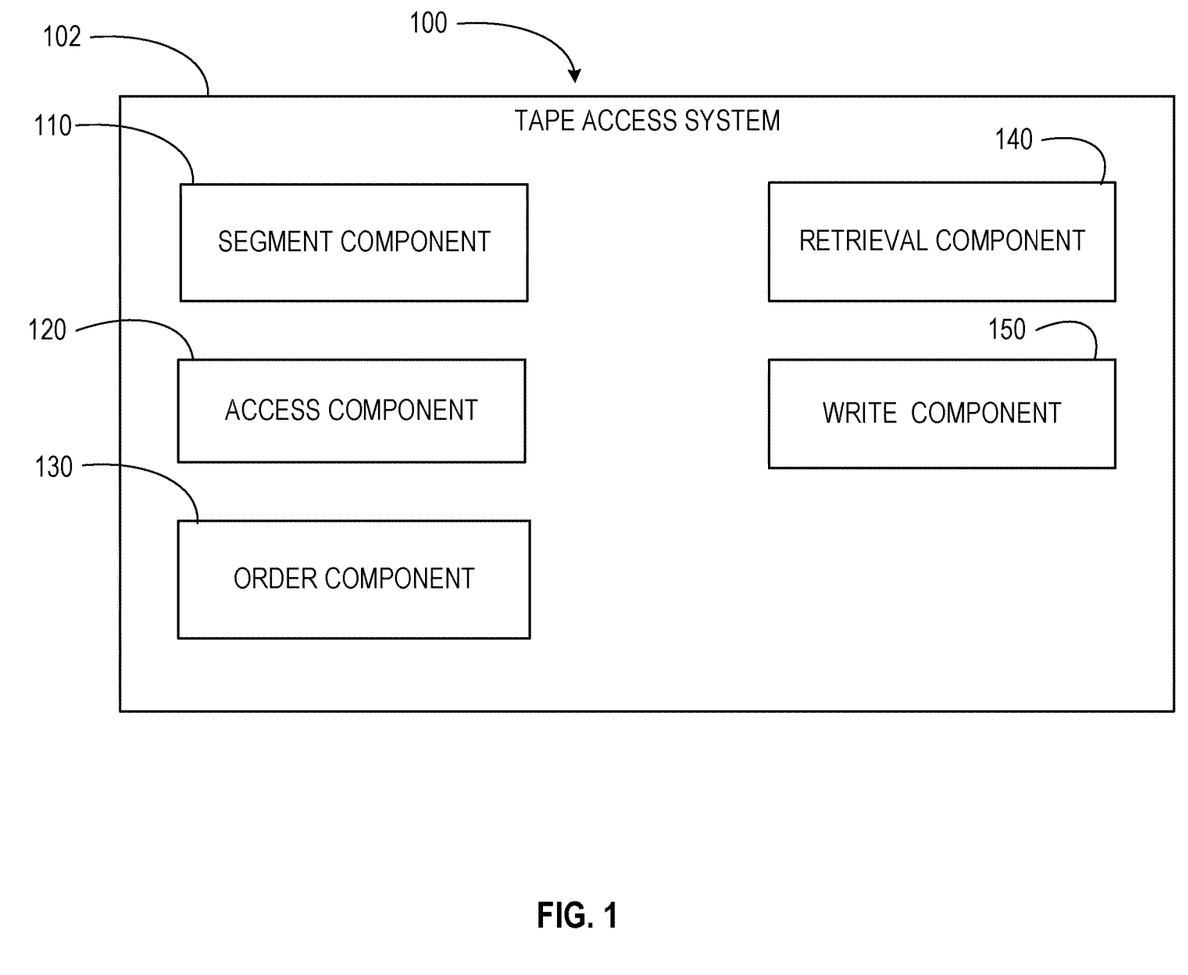
FIG. 1 depicts a block diagram of a computing environment for implementing concepts and computer-based methods, according to at least one embodiment.

Referring now to FIG. 1, a block diagram of an example computing environment 100 is shown. The present disclosure may be implemented within the example computing environment 100. In some embodiments, the computing environment 100 may be included within or embodied by a computer system, described below. The computing environment 100 may comprise a tape access system 102. The tape access system 102 may comprise a segment component 110, an access component 120, an order component 130, a retrieval component 140, and a write component 150. The segment component 110 identifies data or data segments stored on a data storage tape. The access component 120 accesses locations of data and data segments stored on the data storage tape. The order component 130 generates access orders for data or data segments stored on the data storage tape. The retrieval component 140 retrieves data or data segments identified by the segment component 110 or the access component 120 based on the access order. The write component 150 writes data, data segments, or metadata describing such data or data segments to at least a portion of the data storage tape. Although described with distinct components, it should be understood that, in at least some embodiments, components may be combined or divided, or additional components may be added, without departing from the scope of the present disclosure.

Figure 2:
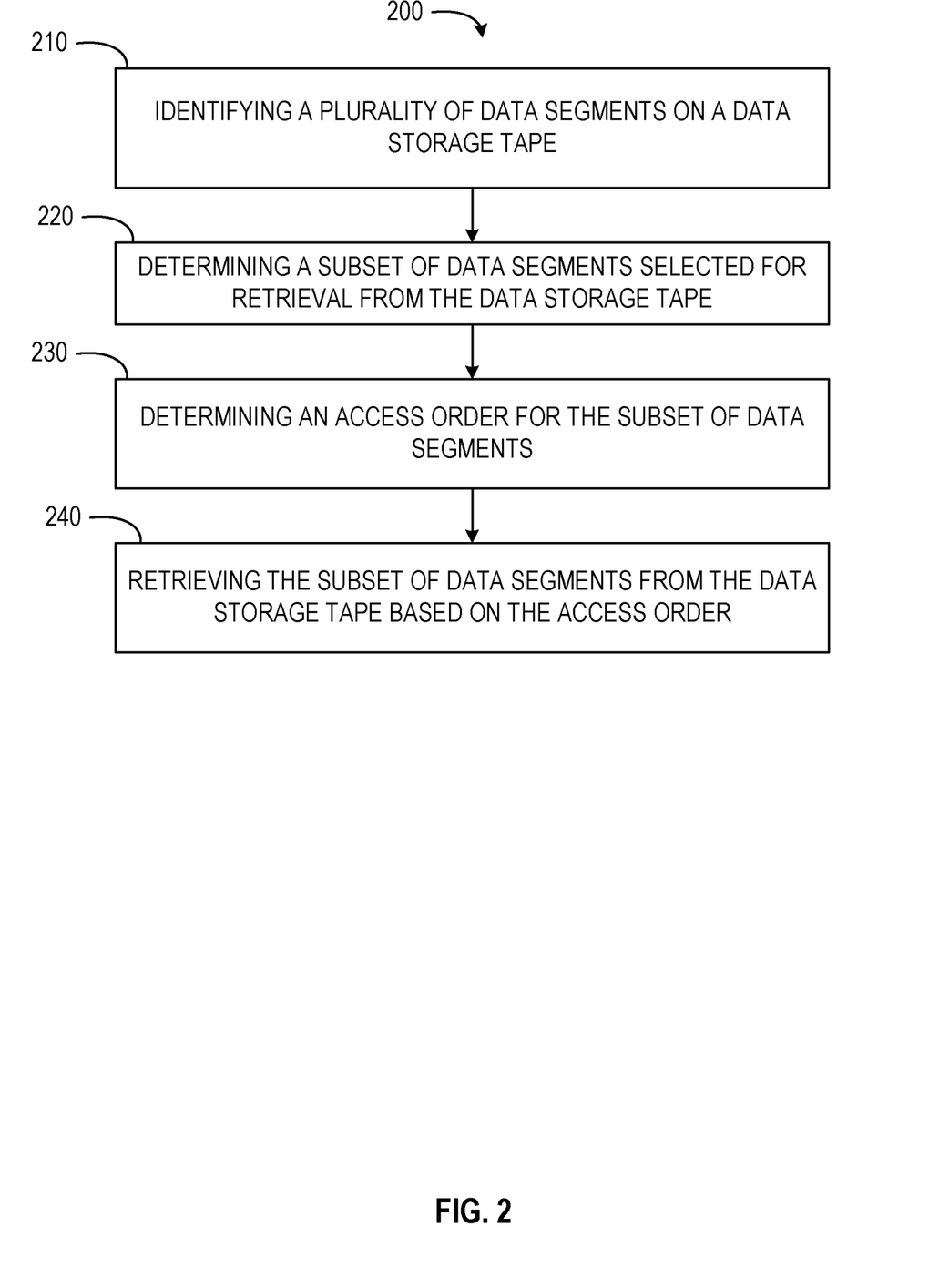
FIG. 2 depicts a flow diagram of a computer-implemented method for data storage tape access optimization, according to at least one embodiment.

Referring now to FIG. 2, a flow diagram of a computer-implemented method 200 is shown. The computer-implemented method 200 is a method for data storage tape access optimization. In some embodiments, the computer-implemented method 200 may be performed by one or more components of the computing environment 100, as described in more detail below.

At operation 210, the segment component 110 identifies a plurality of data segments stored on a data storage tape. In some embodiments, each data segment has a location and a size on the data storage tape. The data segment size and location may be stored on the data storage tape, a database accessible to one or more of the segment component 110 and the tape drive, or any other suitable storage location. The size and location of the plurality of data segments may be loaded into a tape drive controller memory. The tape drive controller memory may be accessible by the segment component 110, may be a portion of the segment component 110, or the segment component may be a portion of the tape drive controller or tape drive controller memory. In some embodiments, the size and location of the plurality of data segments is loaded to a tape storage controller separate from the tape drive accessing the data storage tape.

In some embodiments, operation 210 performed using one or more sub-operations. The segment component 110 may initially determine the data storage tape is mounted or coupled to a tape drive. The segment component 110 may determine the data storage tape is mounted or coupled to the tape drive by accessing one or more components of the tape drive. The components of the tape drive may indicate that a data storage tape is mounted to the tape drive and ready for access. The segment component 110 may then access a first portion of the data storage tape, the tape map, containing metadata related to the data storage tape. The segment component 110 may compare the metadata, such as a data storage tape name or designation, with an expected metadata to verify the data storage tape is mounted to the tape drive.

The segment component 110, alone or in combination with the access component 120, accesses a tape map portion of the data storage tape. Accessing the tape map may be performed in response to determining the data storage tape is coupled to the tape drive. Once the segment component 110 accesses the tape map, the segment component 110 may identify the plurality of data segments in response to the data storage tape drive being coupled to the tape drive and the access of the tape map portion of the data storage tape. In some embodiments, the plurality of data segments may indicate the appropriate data storage tape is coupled to the tape drive. In some instances, the plurality of data segments may be a set of data segments which include a desired or requested group of data segments.

At operation 220, the segment component 110 determines a subset of data segments, of the plurality of data segments, stored on the data storage tape. In some embodiments, the subset of data segments are indicated as segments which have been selected for retrieval from the data storage tape. The segment component 110 may determine the subset of data segments based on a request (e.g., an access request) received by the segment component 110 or the tape access system 102. The subset of data segments may be data segments, or portions thereof, distributed among the plurality of data segments and at differing locations of the data storage tape.

At operation 230, the order component 130 determines an access order for the subset of data segments. In some embodiments, the access order represents a minimized tape cycle time for retrieving the subset of data segments. The tape cycle time may represent a combination of total seek time, total read time, and rewind time for the data storage tape. The total seek time may represent a time to locate the subset of data segments. The total read time may represent a time to access the subset of data segments selected for retrieval. The rewind time may represent a time to return the data storage tape to a start position after accessing a last data segment of the subset of data segments.

In some embodiments, the access order may list data segments to be read from the data storage tape in order to minimize a sum of the tape seek times and tape rewind times. The result of the access order may minimize or theoretically minimize the overall tape cycle time. In some instances, the tape cycle time is minimized where a tape is to be rewound and unmounted immediately after reading the subset of data segments. For example, a data storage tape may be rewound and unmounted immediately where a tape drive is to be used for reading data from additional tapes in quick succession after read operations for the current data storage tape have been completed.

At operation 240, the retrieval component 140 retrieves the subset of data segments from the data storage tape based on the access order. In some embodiments, the retrieval component 140 retrieves the subset of data segments by transmitting or otherwise passing a read request to the tape drive. The retrieval component 140, whether in response to the read request or via direct control, may cause the tape drive to perform one or more operations on the data storage tape. The retrieval component 140 may cause the tape drive to perform one or more seek, read, copy, and transmit operations physically manipulating a position of the data storage tape and retrieving each data segment according to the access order. Once a final data segment of the subset of data segments has been accessed, read, and transmitted to the retrieval component 140, the retrieval component 140 may cause the tape drive to rewind the data storage tape back to a start position for dismounting. Although described with respect to transmitting the accessed data segments to the retrieval component 140, in some embodiments, the retrieval component 140 causes the tape drive to perform operations to access and retrieve the subset of data segments. Once the final data segment has been accessed and read, the retrieval component 140 may cause the tape drive to transmit the retrieved data segments before, during, or after the tape drive rewinds the data storage tape.

Although described with respect to operations being initiated at a beginning of the data storage tape (e.g., a newly mounted data storage tape), the methods described herein may initiate from any position of the data storage tape. These systems and methods may initiate operation where a starting position of the data storage tape is an ending position of a previous tape cycle, or any other position of the data storage tape. In some embodiments, an ending position may be fixed based on a position of a data segment for a specified user or any other suitable criteria. Upon reading data segments for a specified user, a tape rewind operation may not be initiated directly toward a beginning of tape position or directly toward another ending position. Rather, the tape rewind operation may rewind the tape to any suitable, specified, or determined position on the data storage tape.

Figure 3:
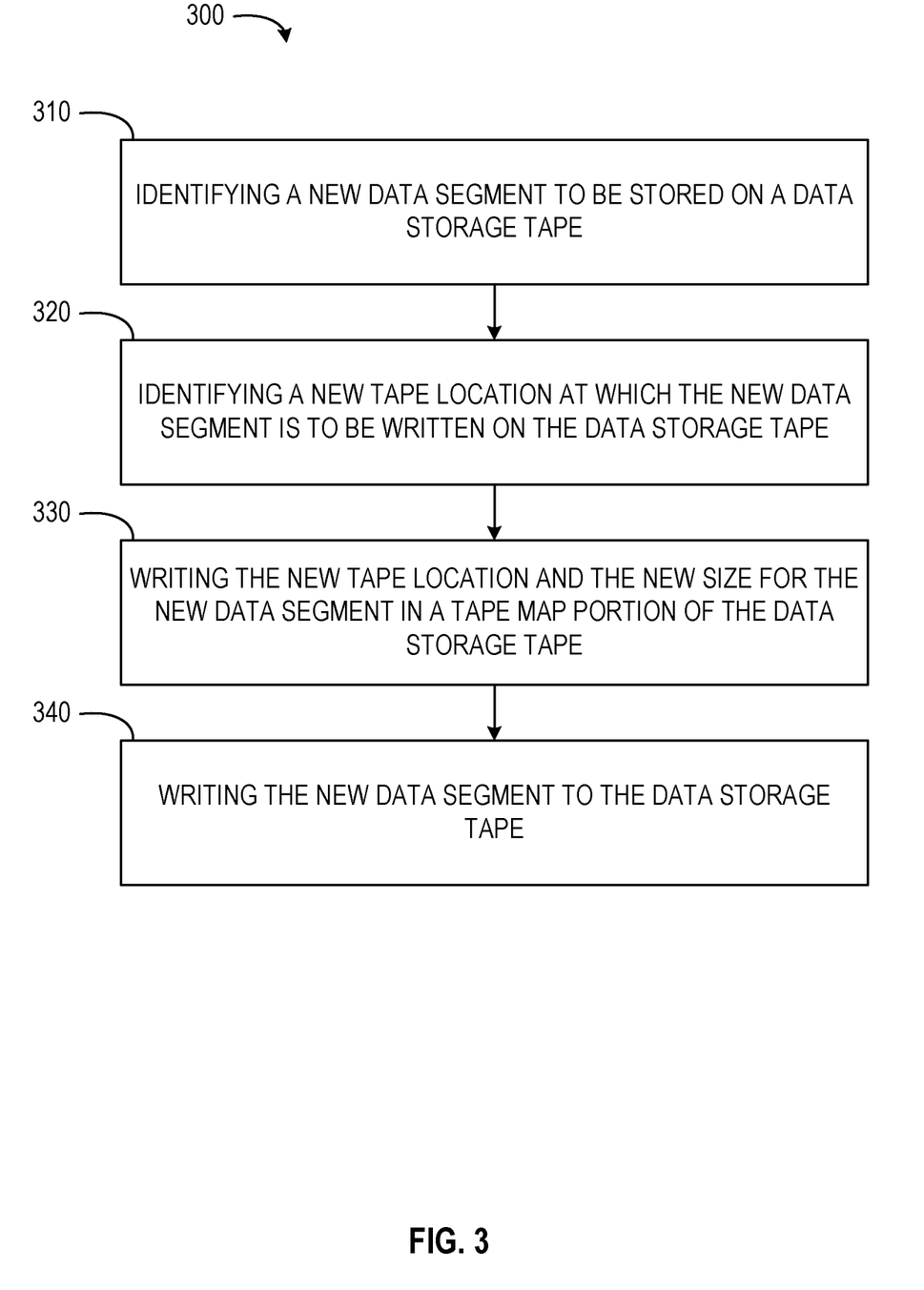
FIG. 3 depicts a flow diagram of a computer-implemented method for data storage tape access optimization, according to at least one embodiment.

FIG. 3 shows a flow diagram of an embodiment of a computer-implemented method 300 for data storage tape access optimization. The method 300 may be performed by or within the computing environment 100. In some embodiments, the method 300 comprises or incorporates one or more operations of the method 200. In some instances, operations of the method 300 may be incorporated as part of or sub-operations of the method 200.

In operation 310, the write component 150 identifies a new data segment to be stored on a data storage tape. The new data segment may be passed to the write component 150 via a computing system, an input device, a cloud resource, or any other suitable computing system or component. In some embodiments, the new data segment represents a file, files, programs, program components, state information, or other suitable data to be stored on a data storage tape. The data may be passed to the write component 150 as part of a backup, long term storage, or other archival process.

In operation 320, the write component 150 identifies a new tape location at which the new data segment is to be written on the data storage tape. The write component 150 may also identify a new size of the new data segment. In some embodiments, identification of the new tape location and the new size may be performed in response to identifying the new data segment in operation 310. The size of the data segment may be passed to the write component along with the data segment. The size may also be calculated by the write component 150 based on operations performed for storing the data segment or configuring the data segment for storage on the data storage tape.

The write component 150 may identify the new tape location based on the size of the new data segment, and amount of data storage tape to be allocated for storing the data segment. In some embodiments, the write component 150 identifies the new tape location within a tape map or high resolution tape map for the data storage tape. The tape map may be a portion of the data storage tape dedicated or designated for storing metadata describing the data stored on the data storage tape and locations at which such data is stored. The tape map may be positioned at a beginning of the data storage tape. In some instances, the tape map is stored in tape cartridge nonvolatile memory. The tape map may also be stored within a local memory, remote memory, cloud resource, or other memory accessible by a tape drive or a computing system associated with the write component 150. The write component 150 may identify the new tape location by accessing the tape map. The write component 150 may compare the new size for the new data segment with available locations and sizes designated within the tape map. The write component 150 may then determine one or more portions of the tape map that represent portions of the data storage tape with suitable space to store the new data segment In operation 330, the write component 150 writes the new tape location and the new size for the new data segment in the tape map portion of the data storage tape. The write component 150 may initiate the tape drive to access a section of the tape map associated with suitable free space on the data storage tape. The write component 150 may then cause the tape drive to write, to the tape map, metadata relating to the new data segment. In some instances, the metadata includes a size of the new data segment, a location or locations on the data storage tape at which the new data segment is to be stored, and an indicator for the new data segment. The indicator may be a file name or any other suitable representation of the new data segment identifiable to enable recall and access of the new data segment at a later time.

In operation 340, the write component 150 writes the new data segment to the data storage tape. The write component 150 may cooperate with one or more components described herein, such as the tape drive, to orient or position the data storage tape at the new tape location to write or otherwise store the new data segment on the data storage tape. The write component 150 may then cause the tape drive to write the new data segment to the data storage tape at the new tape location or new tape locations, such that the new data segment is stored in one or more portions of the data storage tape.

Figure 4:
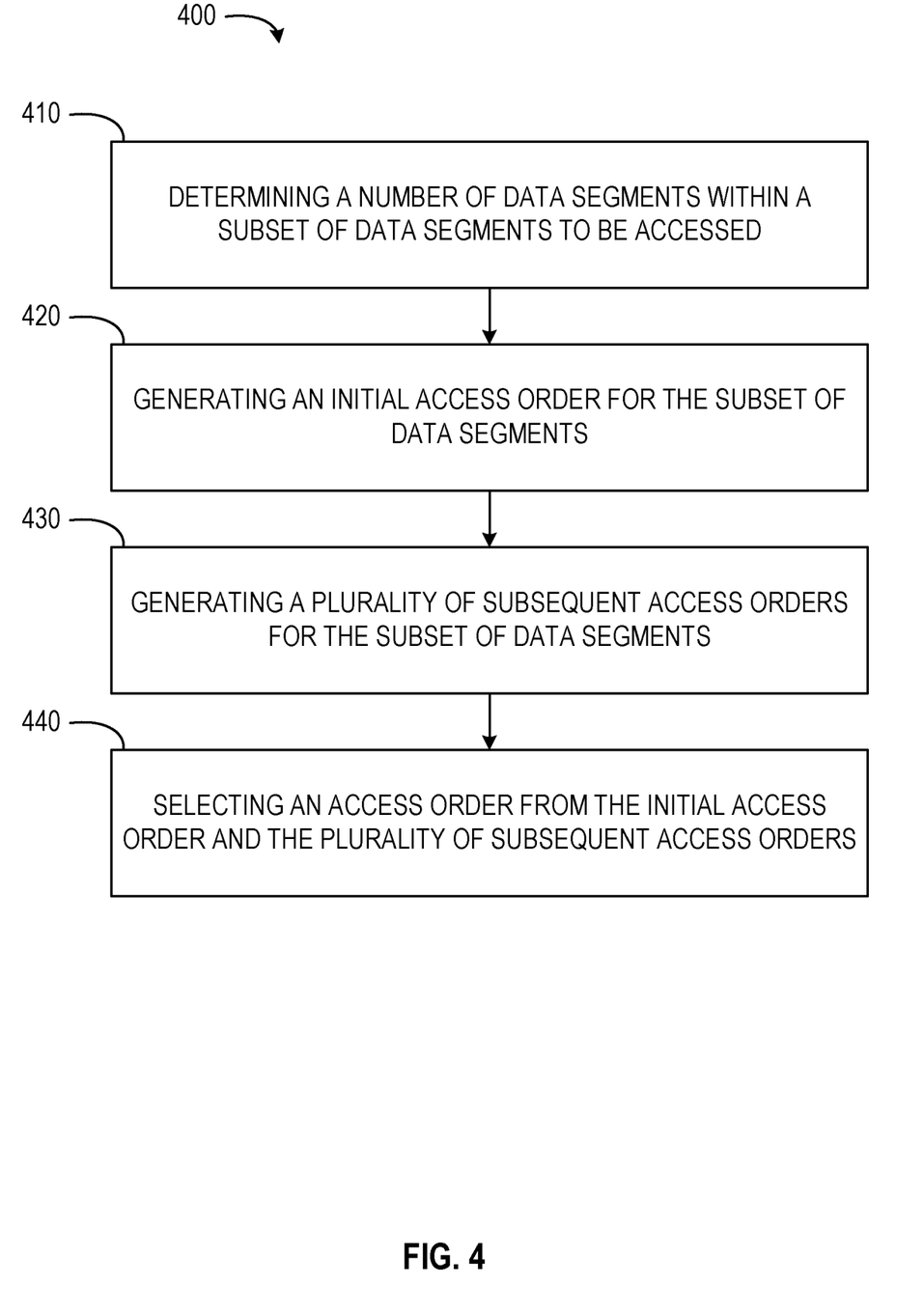
FIG. 4 depicts a flow diagram of a computer-implemented method for data storage tape access optimization, according to at least one embodiment.

FIG. 4 shows a flow diagram of an embodiment of a computer-implemented method 400 for data storage tape access optimization. The method 400 may be performed by or within the computing environment 100. In some embodiments, the method 400 comprises or incorporates one or more operations of the methods 200 or 300. In some instances, operations of the method 400 may be incorporated as part of or sub-operations of the methods 200 or 300.

In operation 410, the order component 130 determines a number of data segments within the subset of data segments to be accessed or otherwise read from the data storage tape. In some embodiments, the number of data segments is determined after identifying or determining the subset of data segments, described above in operation 220. The number of data segments may be identified as a number of discrete or unconnected data segments separated by a distance of the data storage tape. In some embodiments, data segments are considered discrete where a tape distance between two data segments is greater than a predetermined length or distance.

In some embodiments, in determining the number of data segments for retrieval, the order component 130 compares the number of data segments to a threshold value. The threshold value may represent a permutation calculation time for determining a final access order. The threshold value may also represent a number of data segments, below which, permutation calculation time is determined to be acceptable. Where the number of data segments is below the threshold value, the order component 130 may continue to operation 420. In some embodiments, where the number of data segments is above the threshold value, a portion of the data segments may be selected for inclusion in the access order generation. Data segments may also be grouped for generation of access orders, where the number of data segments exceeds the threshold value. For example, the threshold value may be set at ten or fewer data segments.

In some instances, where the number of data segments exceeds the threshold value, the order component 130 may select from one or more access order generation methods. Access generation methods may also be selected where tape unmounting is unnecessary or where the data storage being accessed will be accessed again without unmounting from the tape drive. The order component 130 may select from a tape cycle optimization ordering, minimizing tape cycle time; a tape read optimization ordering, minimizing tape read time; or any other suitable ordering scheme. In some embodiments, the order component 130 selects between ordering methods based on tape drive accessibility. In such instances, where one or more tape drives are idle, or free for data storage tape access, the order component 130 may select between the above-referenced ordering methods. For example, where a number of data storage tapes for which read requests are queued is smaller than the number of tape drives available, the tape read optimization ordering may be used. In this example, where the number of tape drives available is fewer than the number of data storage tapes with associated read requests in a queue, the order component 130 may initiate the tape cycle optimization ordering.

In some embodiments, the order component 130 may select between ordering methodologies based on predicting read requests. In such embodiments, the order component may utilize or be trained using linear regression models or a neural network to predict, before responding to a read request, whether, after serving the request, the number of free tape drives is predicted to be fewer than a number of data storage tapes queued for read requests. Where the number of queued data storage tapes exceeds the number of tape drives, the order component 130 may initiate tape cycle optimization ordering. As noted above, where the number of free tape drives is greater than the number of queued data storage tapes, the order component 130 may select tape read optimization.

In some embodiments, the order component 130 may offer manual selection of the ordering methodology. In such instances, once a request is received, or at any other time, the order component 130 may present a user interface indicating one or more available order methodologies. The order component 130 may receive manual selection of the ordering methodology and implement that ordering methodology until receiving a subsequent selection or until the order component 130 detects a stop condition, such as a backlog of queued data storage tapes having active read requests.

In operation 420, the order component 130 generates an initial access order for the subset of data segments. In some embodiments, the initial access order has an initial tape cycle time. Once generated, the initial access order may be assigned an order designation and associated with the initial tape cycle time. For example, the order designation of the initial access order may be set to S and set n=1.

In operation 430, the order component 130 generates a plurality of subsequent access orders for the subset of data segments. In some embodiments, each subsequent access order has an associated tape cycle time. Each subsequent access order may be assigned an order designation and associated with a distinct cycle time associated with that access order. For example, the order designation for a subsequent access order may be set to C.

In embodiments where the order component 130 performs a threshold comparison, the order component 130 may generate a permutation limit for a number of subsequent access orders to be generated within the plurality of subsequent access orders. The permutation limit may be generated based on comparing the number of data segments to the threshold value. The permutation limit may be generated such that a time for generating order permutations for the initial access order and plurality of subsequent access orders is below a predetermined amount of time or a dynamically generated amount of time based on queued requests for reading data storage tapes.

In embodiments where the order component 130 performs a threshold comparison, the order component may generate a set of data segment groups from the subset of data segments. In such instances, the initial access order and the plurality of subsequent access orders may be generated based on the set of data segment groups. Data segment groups may be generated as two or more data segments which are consecutive on the data storage tape. In such embodiments, the initial data segment may be identified and data segments may be iteratively appended to generate a group until the next data segment to be accessed is not consecutively stored on the data storage tape. Once a group has been determined, the order component 130 may proceed to a next data segment in the subset of data segments and determine whether that data segment should be grouped with one or more subsequent or consecutive data segments. Once the data segment groups have been determined, additional subsequent access orders may be determined using the data segment groups. In some embodiments, the order component 130 may evaluate groups and orders by evaluating a limited number of tail insertions for each group that further change the ordering by moving the last in order data segment to another position if that improves the tape cycle optimization order.

In operation 440, the order component 130 selects an access order from the initial access order and the plurality of subsequent access orders. The order component 130 may select the access order by evaluating an optimization function. In some embodiments, the optimization function may be represented as: ftco=sum(seeks time)+rewind time for S and C orderings. "FTCO" may be understood as a tape cycle optimization function. In evaluating the initial access order and a subsequent access order, if ftco(C)<ftco(S), that subsequent access order may be selected. In some instances, where ftco(C)<ftco(S) and additional subsequent access orders have been generated but are not yet evaluated, the order component 130 may compare the previously evaluated subsequent access order (e.g., a first subsequent access order) with another subsequent access order (e.g., a second subsequent access order). The order component 130 may continue generating and evaluating additional subsequent access orders where a number of generated access orders is below a maximum number of permutations (e.g., n<N_max). In some embodiments, where a maximum number of permutation orders is reached, the access order having the lowest tape cycle time may be selected for use by the order component 130.

Figure 5:
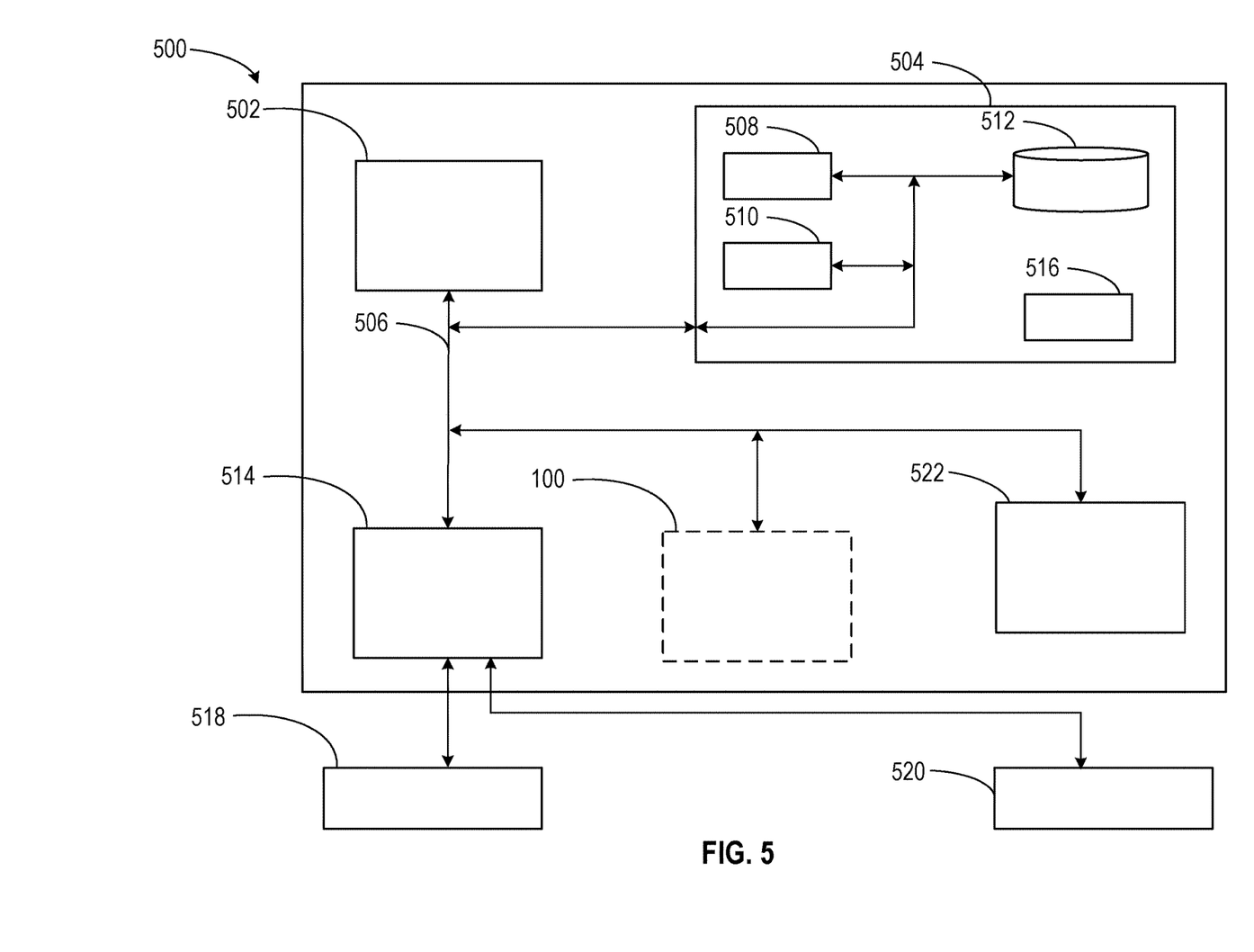
FIG. 5 depicts a block diagram of a computing system for data storage tape access optimization, according to at least one embodiment.

Embodiments of the present disclosure may be implemented together with virtually any type of computer, regardless of the platform being suitable for storing and/or executing program code. FIG. 5 shows, as an example, a computing system 500 (e.g., cloud computing system) suitable for executing program code related to the methods disclosed herein and for domain clustering and malicious campaign identification.

The computing system 500 is only one example of a suitable computer system and is not intended to suggest any limitation as to the scope of use or functionality of embodiments of the present disclosure described herein, regardless, whether the computer system 500 is capable of being implemented and/or performing any of the functionality set forth hereinabove. In the computer system 500, there are components, which are operational with numerous other general purpose or special purpose computing system environments or configurations. Examples of well-known computing systems, environments, and/or configurations that may be suitable for use with computer system/server 500 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. Computer system/server 500 may be described in the general context of computer system-executable instructions, such as program modules, being executed by a computer system 500. Generally, program modules may include routines, programs, objects, components, logic, data structures, and so on that perform particular tasks or implement particular abstract data types. Computer system/server 500 may be practiced in distributed cloud computing environments where tasks are performed by remote processing devices that are linked through a communications network. In a distributed cloud computing environment, program modules may be located in both, local and remote computer system storage media, including memory storage devices.

As shown in the figure, computer system/server 500 is shown in the form of a general-purpose computing device. The components of computer system/server 500 may include, but are not limited to, one or more processors 502 (e.g., processing units), a system memory 504 (e.g., a computer-readable storage medium coupled to the one or more processors), and a bus 506 that couple various system components including system memory 504 to the processor 502. Bus 506 represents one or more of any of several types of bus structures, including a memory bus or memory controller, a peripheral bus, an accelerated graphics port, and a processor or local bus using any of a variety of bus architectures. By way of example, and not limiting, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Computer system/server 500 typically includes a variety of computer system readable media. Such media may be any available media that is accessible by computer system/server 500, and it includes both, volatile and non-volatile media, removable and non-removable media.

The system memory 504 may include computer system readable media in the form of volatile memory, such as random-access memory (RAM) 508 and/or cache memory 510. Computer system/server 500 may further include other removable/non-removable, volatile/non-volatile computer system storage media. By way of example only, a storage system 512 may be provided for reading from and writing to a non-removable, non-volatile magnetic media (not shown and typically called a 'hard drive'). Although not shown, a magnetic disk drive for reading from and writing to a removable, non-volatile magnetic disk (e.g., a 'floppy disk'), and an optical disk drive for reading from or writing to a removable, non-volatile optical disk such as a CD-ROM, DVD-ROM or other optical media may be provided. In such instances, each can be connected to bus 506 by one or more data media interfaces. As will be further depicted and described below, the system memory 504 may include at least one program product having a set (e.g., at least one) of program modules that are configured to carry out the functions of embodiments of the present disclosure.

The program/utility, having a set (at least one) of program modules 516, may be stored in the system memory 504 by way of example, and not limiting, as well as an operating system, one or more application programs, other program modules, and program data. Program modules may include one or more of the segment component 110, the access component 120, the order component 130, the retrieval component 140, and the write component 150, which are illustrated in FIG. 1. Each of the operating systems, one or more application programs, other program modules, and program data or some combination thereof, may include an implementation of a networking environment. Program modules 516 generally carry out the functions and/or methodologies of embodiments of the present disclosure, as described herein. In some embodiments, the program modules 516, or a portion thereof, are contained or implemented on a computing system external to a tape drive. In some embodiments, the program modules 516, or a portion thereof, are contained or implemented on a tape drive. Once a data storage tape is mounted, the program modules 516 generate access orders or recompute previously generated access orders to ensure that data recall operations are optimized.

The computer system/server 500 may also communicate with one or more external devices 518 such as a keyboard, a pointing device, a display 520, etc.; one or more devices that enable a user to interact with computer system/server 500; and/or any devices (e.g., network card, modem, etc.) that enable computer system/server 500 to communicate with one or more other computing devices. Such communication can occur via Input/Output (I/O) interfaces 514. Still yet, computer system/server 500 may communicate with one or more networks such as a local area network (LAN), a general wide area network (WAN), and/or a public network (e.g., the Internet) via network adapter 522. As depicted, network adapter 522 may communicate with the other components of computer system/server 500 via bus 506. It should be understood that, although not shown, other hardware and/or software components could be used in conjunction with computer system/server 500. Examples include, but are not limited to: microcode, device drivers, redundant processing units, external disk drive arrays, RAID systems, tape drives, and data archival storage systems, etc.

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service.

Figure 6:
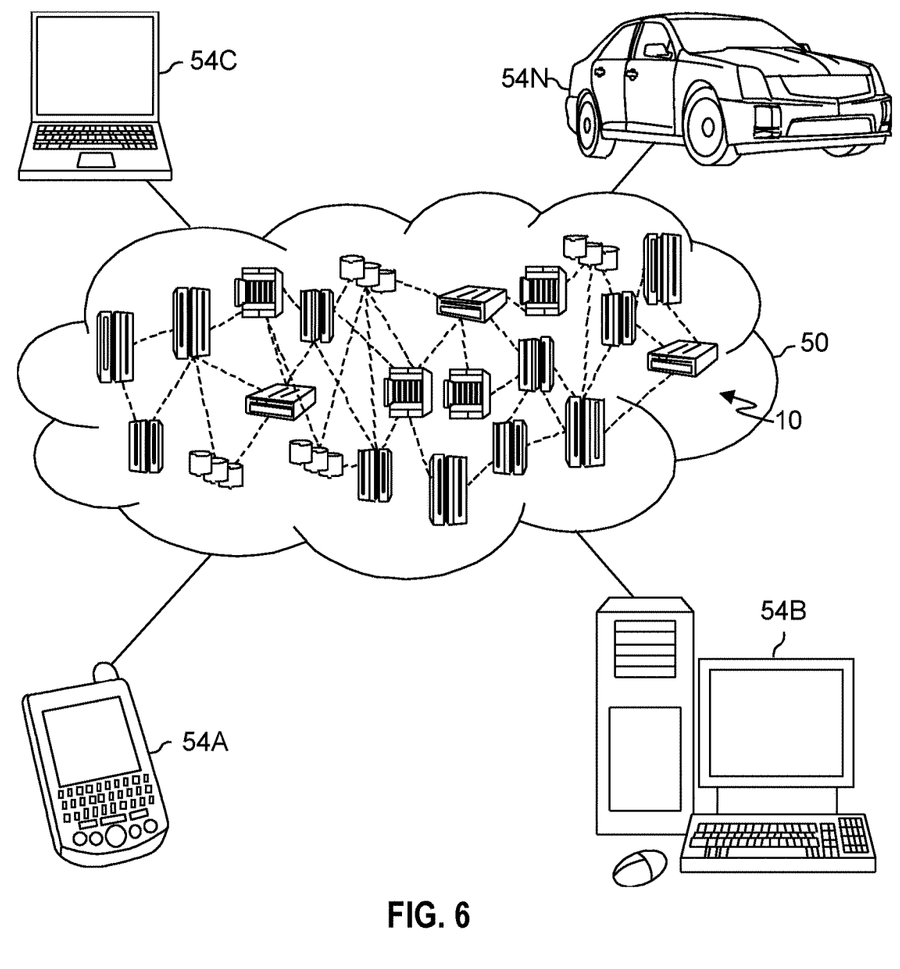
FIG. 6 is a schematic diagram of a cloud computing environment in which concepts of the present disclosure may be implemented, in accordance with an embodiment of the present disclosure.

Referring now to FIG. 6, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 7:
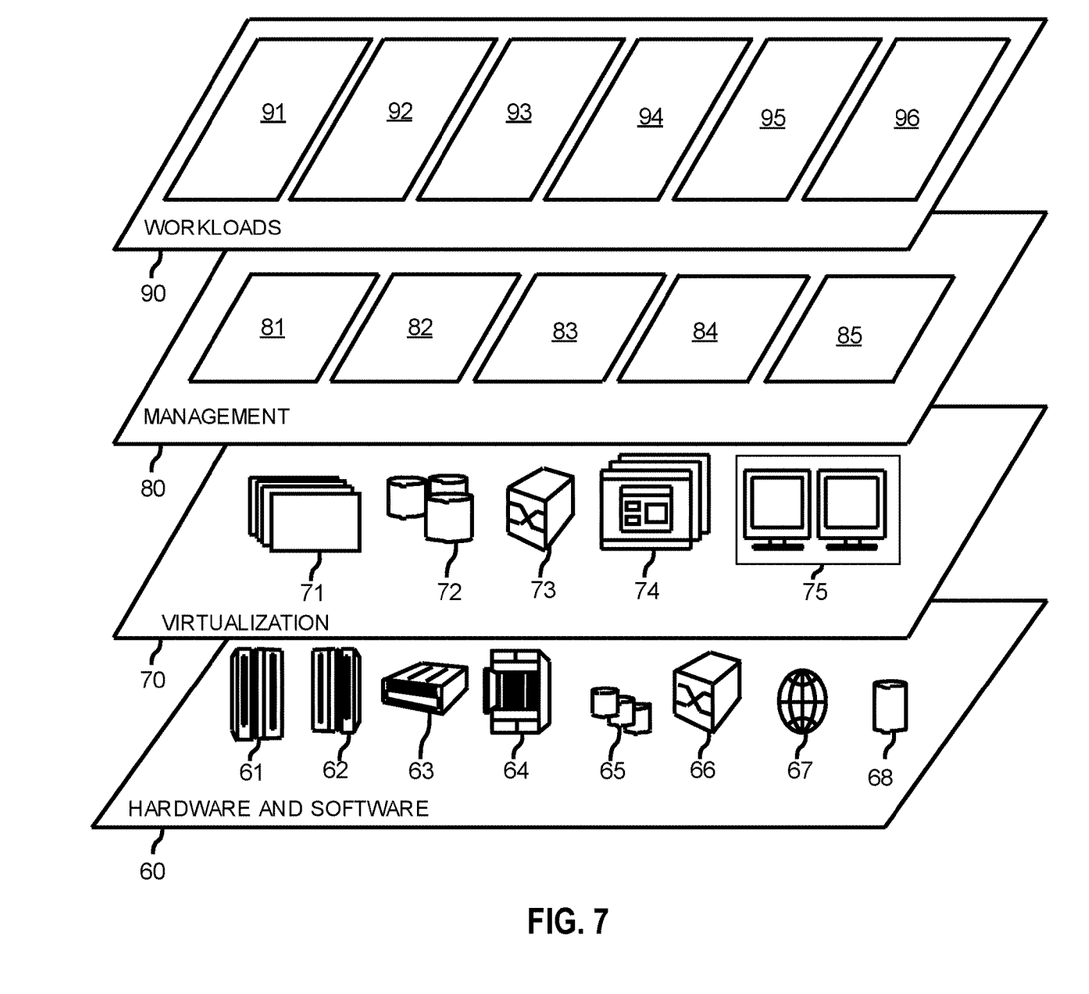
FIG. 7 is a diagram of model layers of a cloud computing environment in which concepts of the present disclosure may be implemented, in accordance with an embodiment of the present disclosure.

Referring now to FIG. 7, a set of functional abstraction layers provided by cloud computing environment 50 (FIG. 5) is shown. It should be understood in advance that the components, layers, and functions shown in FIG. 6 are intended to be illustrative only and embodiments of the disclosure are not limited thereto. As depicted, the following layers and corresponding functions are provided:

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and network traffic direction processing 96.

The descriptions of the various embodiments of the present disclosure have been presented for purposes of illustration, but are not intended to be exhaustive or limited to the embodiments disclosed. Many modifications and variations will be apparent to those of ordinary skills in the art without departing from the scope and spirit of the described embodiments. The terminology used herein was chosen to best explain the principles of the embodiments, the practical application or technical improvement over technologies found in the marketplace, or to enable others of ordinary skills in the art to understand the embodiments disclosed herein.

The present invention may be embodied as a system, a method, and/or a computer program product. The computer program product may include a computer-readable storage medium (or media) having computer readable program instructions thereon for causing a processor to carry out aspects of the present invention.

The computer-readable storage medium may be an electronic, magnetic, optical, electromagnetic, infrared or a semi-conductor system for a propagation medium. Examples of a computer-readable medium may include a semi-conductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W), DVD and Blu-Ray-Disk.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disk read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer-readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Smalltalk, C++ or the like, and conventional procedural programming languages, such as the "C" programming language or similar programming languages. The computer readable program instructions may execute entirely on the user's computer, partly on the user's computer as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatuses, or another device to cause a series of operational steps to be performed on the computer, other programmable apparatus or other device to produce a computer implemented process, such that the instructions which execute on the computer, other programmable apparatuses, or another device implement the functions/acts specified in the flowchart and/or block diagram block or blocks.

The flowcharts and/or block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or act or carry out combinations of special purpose hardware and computer instructions.

The terminology used herein is for the purpose of describing particular embodiments only and is not intended to limit the present disclosure. As used herein, the singular forms "a", "an" and "the" are intended to include the plural forms as well, unless the context clearly indicates otherwise. It will further be understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or steps plus function elements in the claims below are intended to include any structure, material, or act for performing the function in combination with other claimed elements, as specifically claimed. The description of the present disclosure has been presented for purposes of illustration and description, but is not intended to be exhaustive or limited to the present disclosure in the form disclosed. Many modifications and variations will be apparent to those of ordinary skills in the art without departing from the scope of the present disclosure. The embodiments are chosen and described in order to explain the principles of the present disclosure and the practical application, and to enable others of ordinary skills in the art to understand the present disclosure for various embodiments with various modifications, as are suited to the particular use contemplated.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A computer-implemented method, comprising:
   identifying a plurality of data segments stored on a data storage tape, each data segment having a location and a size on the data storage tape;
   determining a subset of data segments, of the plurality of data segments, stored on the data storage tape, the subset of data segments selected for retrieval from the data storage tape;
   determining an access order for the subset of data segments, the access order representing a minimized tape cycle time for retrieving the subset of data segments, wherein the tape cycle time represents a combination of total seek time to locate the subset of data segments, total read time to access the subset of data segments, and a rewind time to return the data storage tape to a start position after accessing a last data segment of the subset of data segments, the access order determined by:
   determining a number of data segments within the subset of data segments by comparing the number of data segments to a threshold value representing a permutation calculation time for determining a final access order;
   generating an initial access order for the subset of data segments, the initial access order having an initial tape cycle time;
   generating a plurality of subsequent access orders for the subset of data segments, each subsequent access order having an associated tape cycle time; and
   selecting the access order from the initial access order and the plurality subsequent access orders; and
   retrieving the subset of data segments from the data storage tape based on the access order.

2. The method of claim 1, further comprising:
   identifying a new data segment to be stored on the data storage tape;
   in response to identifying the new data segment, identifying a new tape location at which the new data segment is to be written on the data storage tape and a new size of the new data segment; and
   writing the new tape location and the new size, for the new data segment, in a tape map portion of the data storage tape.

3. The method of claim 1, further comprising:
   determining the data storage tape is coupled to a tape drive; and
   in response to determining the data storage tape is coupled, accessing a tape map portion of the data storage tape, and wherein the plurality of data segments are identified in response to the data storage tape drive being coupled to a tape drive and accessing of the tape map portion of the data storage tape.

4. The method of claim 1, further comprising:
   based on comparing the number of data segments to the threshold value, generating a permutation limit for a number of subsequent access orders to be generated within the plurality of subsequent access orders.

5. The method of claim 1, further comprising:
   based on comparing the number of data segments to the threshold value, generating a set of data segment groups from the subset of data segments, wherein the initial access order and the plurality of subsequent access orders are generated based on the set of data segment groups.

6. A system, comprising:
   one or more processors; and
   a computer-readable storage medium, coupled to the one or more processors, storing program instructions that, when executed by the one or more processors, cause the one or more processors to perform operations comprising:
   identifying a plurality of data segments stored on a data storage tape, each data segment having a location and a size on the data storage tape;
   determining a subset of data segments, of the plurality of data segments, stored on the data storage tape, the subset of data segments selected for retrieval from the data storage tape;
   determining an access order for the subset of data segments, the access order representing a minimized tape cycle time for retrieving the subset of data segments, wherein the tape cycle time represents a combination of total seek time to locate the subset of data segments, total read time to access the subset of data segments, and a rewind time to return the data storage tape to a start position after accessing a last data segment of the subset of data segments, the access order determined by:

determining a number of data segments within the subset of data segments by comparing the number of data segments to a threshold value representing a permutation calculation time for determining a final access order;

generating an initial access order for the subset of data segments, the initial access order having an initial tape cycle time;

generating a plurality of subsequent access orders for the subset of data segments, each subsequent access order having an associated tape cycle time; and     selecting the access order from the initial access order and the plurality subsequent access orders; and retrieving the subset of data segments from the data storage tape based on the access order.

7. The system of claim 6, wherein the operations further comprise:

identifying a new data segment to be stored on the data storage tape;

in response to identifying the new data segment, identifying a new tape location at which the new data segment is to be written on the data storage tape and a new size of the new data segment; and writing the new tape location and the new size, for the new data segment, in a tape map portion of the data storage tape.

8. The system of claim 6, wherein the operations further comprise:

determining the data storage tape is coupled to a tape drive; and in response to determining the data storage tape is coupled, accessing a tape map portion of the data storage tape, and wherein the plurality of data segments are identified in response to the data storage tape drive being coupled to a tape drive and accessing of the tape map portion of the data storage tape.

9. The system of claim 6, wherein the operations further comprise:

based on comparing the number of data segments to the threshold value, generating a permutation limit for a number of subsequent access orders to be generated within the plurality of subsequent access orders.

10. The system of claim 6, wherein the operations further comprise:

based on comparing the number of data segments to the threshold value, generating a set of data segment groups from the subset of data segments, wherein the initial access order and the plurality of subsequent access orders are generated based on the set of data segment groups.

11. A computer program product comprising a computer readable storage medium having program instructions embodied therewith, the program instructions being executable by one or more processors to cause the one or more processors to perform operations comprising:

identifying a plurality of data segments stored on a data storage tape, each data segment having a location and a size on the data storage tape;

determining a subset of data segments, of the plurality of data segments, stored on the data storage tape, the subset of data segments selected for retrieval from the data storage tape;

determining an access order for the subset of data segments, the access order representing a minimized tape cycle time for retrieving the subset of data segments, wherein the tape cycle time represents a combination of total seek time to locate the subset of data segments, total read time to access the subset of data segments, and a rewind time to return the data storage tape to a start position after accessing a last data segment of the subset of data segments, the access order determined by:

determining a number of data segments within the subset of data segments by comparing the number of data segments to a threshold value representing a permutation calculation time for determining a final access order;

generating an initial access order for the subset of data segments, the initial access order having an initial tape cycle time;

generating a plurality of subsequent access orders for the subset of data segments, each subsequent access order having an associated tape cycle time; and     selecting the access order from the initial access order and the plurality subsequent access orders; and retrieving the subset of data segments from the data storage tape based on the access order.

12. The computer program product of claim 11, wherein the operations further comprise:

identifying a new data segment to be stored on the data storage tape;

in response to identifying the new data segment, identifying a new tape location at which the new data segment is to be written on the data storage tape and a new size of the new data segment; and writing the new tape location and the new size, for the new data segment, in a tape map portion of the data storage tape.

13. The computer program product of claim 11, wherein the operations further comprise determining the data storage tape is coupled to a tape drive; and in response to determining the data storage tape is coupled, accessing a tape map portion of the data storage tape, and wherein the plurality of data segments are identified in response to the data storage tape drive being coupled to a tape drive and accessing of the tape map portion of the data storage tape.

\* \* \* \* \*